United States Patent
Ueki et al.

(10) Patent No.: US 9,673,435 B2
(45) Date of Patent: Jun. 6, 2017

(54) NONAQUEOUS ELECTROLYTE SECONDARY BATTERY

(75) Inventors: Tomoyoshi Ueki, Toyota (JP); Hideaki Fujita, Kyotanabe (JP); Harunari Shimamura, Moriguchi (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 57 days.

(21) Appl. No.: 14/115,220

(22) PCT Filed: May 2, 2011

(86) PCT No.: PCT/JP2011/060556
§ 371 (c)(1),
(2), (4) Date: Feb. 10, 2014

(87) PCT Pub. No.: WO2012/150635
PCT Pub. Date: Nov. 8, 2012

(65) Prior Publication Data
US 2014/0193691 A1  Jul. 10, 2014

(51) Int. Cl.
| H01M 2/16 | (2006.01) |
| H01M 4/485 | (2010.01) |
| H01M 4/505 | (2010.01) |
| H01M 4/525 | (2010.01) |
| H01M 10/052 | (2010.01) |

(52) U.S. Cl.
CPC ....... *H01M 2/1686* (2013.01); *H01M 2/1646* (2013.01); *H01M 4/485* (2013.01); *H01M 4/505* (2013.01); *H01M 4/525* (2013.01); *H01M 10/052* (2013.01); *Y02T 10/7011* (2013.01)

(58) Field of Classification Search
CPC .. H01M 2/1686; H01M 2/1646; H01M 4/505; H01M 4/485; H01M 10/052; H01M 4/525; Y02E 60/122; Y02T 10/7011
See application file for complete search history.

(56) References Cited

U.S. PATENT DOCUMENTS

2009/0233176 A1    9/2009  Kita et al.
2009/0325074 A1*  12/2009  Fukumoto et al. ...... 429/231.95
(Continued)

FOREIGN PATENT DOCUMENTS

| JP | 2005-340089 | 12/2005 |
| JP | 2006-179432 | 7/2006 |

(Continued)

*Primary Examiner* — Cynthia K Walls
(74) *Attorney, Agent, or Firm* — Finnegan, Henderson, Farabow, Garrett & Dunner, LLP

(57) ABSTRACT

A nonaqueous electrolyte secondary battery 100 according to the present invention is provided with an electrode assembly 80 having a structure in which a positive electrode 10 and a negative electrode 20 are stacked with a separator 30 interposed therebetween. A porous filler layer 32 is formed between the positive electrode 10 and the separator 30. The filler layer 32 contains a filler made of an inorganic material and contains a binder. The relationship T>D holds where T is the average thickness of the filler layer 32 and D is the average particle diameter of a positive electrode active material 15 present in the positive electrode 10 facing the filler layer 32, and a pressure applied to the electrode assembly 80 in the stacking direction is set to at least 0.1 MPa.

9 Claims, 6 Drawing Sheets

(56) References Cited

U.S. PATENT DOCUMENTS

| | | | |
|---|---|---|---|
| 2010/0227207 A1 | 9/2010 | Fukumoto et al. | |
| 2010/0248035 A1* | 9/2010 | Minami et al. | 429/231.95 |
| 2010/0266900 A1* | 10/2010 | Makidera et al. | 429/224 |
| 2010/0285348 A1* | 11/2010 | Murata et al. | 429/144 |
| 2010/0330410 A1* | 12/2010 | Takahashi et al. | 429/129 |
| 2011/0206977 A1 | 8/2011 | Ikeda | |
| 2011/0223492 A1* | 9/2011 | Sakitani et al. | 429/339 |
| 2012/0082883 A1 | 4/2012 | Yamaguchi et al. | |

FOREIGN PATENT DOCUMENTS

| | | |
|---|---|---|
| JP | 2007-109633 | 4/2007 |
| JP | 2008-27634 | 2/2008 |
| JP | 2010-113966 | 5/2010 |
| JP | 2010-277756 | 12/2010 |
| WO | WO 2007/072759 A | 6/2007 |

* cited by examiner (a)           (b)

(a)　　　　　　　　　(b)

NONAQUEOUS ELECTROLYTE SECONDARY BATTERY

CROSS-REFERENCE TO RELATED APPLICATIONS

This application is a national phase application of International Application No. PCT/JP2011/060556, filed May 2, 2011, the content of which is incorporated herein by reference.

TECHNICAL FIELD

The present invention relates to a nonaqueous electrolyte secondary battery and more particularly relates to a nonaqueous electrolyte secondary battery in which a filler layer is disposed between the separator sheet and the positive electrode sheet.

BACKGROUND ART

The importance of lithium secondary batteries, nickel hydride batteries, and other secondary batteries as vehicle-mounted power sources and as power sources for personal computers and portable and mobile electronic devices has been on the rise in recent years. In particular, lithium secondary batteries, which are light and provide a high energy density, are expected to be preferably used as high-output vehicular power sources. A typical configuration for this type of lithium secondary battery is provided with an electrode assembly having a structure in which sheet-shaped electrodes are wound into a spiral shape (wound electrode assembly). To form this wound electrode assembly, for example, a positive electrode sheet having a structure in which a positive electrode active material layer containing a positive electrode active material is supported on both sides of a positive electrode current collector and a negative electrode sheet having a structure in which a negative electrode active material layer containing a negative electrode active material is supported on both sides of a negative electrode current collector are wound into a spiral shape with a separator sheet interposed therebetween. In order to ensure ionic permeability between the positive electrode and negative electrode, this separator sheet takes the form of a resin sheet of, e.g., polyethylene (PE), polypropylene (PP), and so forth, in which a large number of pores are formed.

Separator sheets of, e.g., polyethylene (PE), polypropylene (PP), and so forth, do offer the advantage of exhibiting a shutdown function at suitable temperatures (for example, approximately 130° C.); however, due to their oxidative deterioration when exposed to the charging potential of the positive electrode, they are also associated with the problem of a decline in battery performance. Furthermore, they change shape upon melting at temperatures of 140° C. to 150° C., and as a consequence, when the battery temperature rises further even after shutdown, the separator sheet undergoes a change in shape (heat shrinkage), creating the possibility for an internal short circuit to occur.

The placement of a porous, heat-resistant filler layer on the surface of the separator sheet has been investigated for the purpose of preventing the short circuiting brought about by heat shrinkage of the separator sheet. For example, Patent Literature 1 describes an art in which a porous heat-resistant layer (filler layer) containing a finer made of a metal oxide is disposed on the side where the positive electrode plate and negative electrode plate face each other. Other art relative to this type of heat-resistant filler layer is provided in, for example, Patent Literature 2 and Patent literature 3.

CITATION LIST

Patent Literature

Patent Literature 1: Japanese Patent Application Laid-open No. 2008-027634
Patent Literature 2: Japanese Patent Application Laid-open No. 2007-109633
Patent Literature 3: Japanese Patent Application Laid-open No. 2005-340089

SUMMARY OF INVENTION

When this type of lithium secondary battery is installed in a vehicle, e.g., in an automobile, in order to obtain a high output a battery pack is constructed in which a plurality of single batteries, each composed of this lithium secondary battery, are connected in series. Given the assumptions of a limited installation space and use in an environment where vibrations are produced, such a battery pack may be constructed with the plurality of single batteries regularly arrayed and retained (i.e., the individual single batteries are fixed to each other). When this retention is performed, a suitable pressure is applied to the individual single batteries that constitute the battery pack.

The present inventors discovered a new problem, i.e., in the case of a nonaqueous electrolyte secondary battery in which a filler layer is formed between the separator and an electrode, when the battery is used in a retained state, a leakage current is produced between the positive electrode and the negative when the separator sheet melts during a high temperature episode (i.e., the inhibitory effect exercised by the filler layer on short circuiting is not adequately expressed), and pursued a solution to this problem. The present invention was pursued considering these points and takes as its main object the introduction of an optimal nonaqueous electrolyte battery in which leakage current generation is suppressed even when the separator melts during a high temperature episode.

The nonaqueous electrolyte secondary battery according to the present invention is a nonaqueous electrolyte secondary battery that is provided with an electrode assembly having a structure in which a positive electrode and a negative electrode are stacked with a separator interposed therebetween. A porous filler layer is formed between the separator and the positive electrode and/or the negative electrode. This filler layer contains a filler made of an inorganic material and contains a binder. The relationship $T > D$ holds where T is an average thickness of the filler layer and D is an average particle diameter of an electrode active material present in the electrode facing the filler layer, and a pressure applied to the electrode assembly in the stacking direction is set to at least 0.1 MPa.

Here, the average particle diameter of the electrode active material refers to the volume-based $D_{50}$ diameter measured using an ordinary laser diffraction particle size distribution analyzer. The average thickness of the filler layer can be determined, for example, by calculating the average value of the film thickness measured at at least one randomly selected location on the SEM image photographed using a scanning electron microscope (SEM).

In the nonaqueous electrolyte secondary battery of the present invention, the interval between the positive electrode and the negative electrode can be held constant and a decline in the battery output can be suppressed because the pressure (surface pressure) applied in the stacking direction to the electrode assembly is set to at least 0.1 MPa. Moreover, because a structure is set up in which the average thickness T of the filler layer is larger than the average particle diameter D of the electrode active material, when the separator melts and even when the electrode active material penetrates into the filler layer due to the aforementioned pressure, short circuiting between the positive electrode and the negative electrode can be avoided, and the generation of a leakage current between the positive electrode and the negative electrode can be suppressed. That is, the present invention can provide a nonaqueous electrolyte secondary battery in which, even in a high-temperature environment where the separator melts, the leakage current produced by the penetration of electrode active material into the filler layer can be inhibited.

In a preferred aspect of the herein disclosed nonaqueous electrolyte secondary battery, the difference between the average thickness T of the filler layer and the average particle diameter D of the positive electrode active material is at least 0.5 μm (preferably at least 0.7 μm, more preferably at least 2 μm, and particularly preferably at least 2.5 μm). A particularly good expression of the above-described effects can be obtained within this size difference range. In a preferred aspect, the average thickness T of the filler layer is at least 6 μm and the average particle diameter D of the electrode active material in the electrode material is not more than 5.5 μm.

In a preferred aspect of the herein disclosed nonaqueous electrolyte secondary battery, the filler present in the filler layer is at least one metal compound selected from the group consisting of alumina, magnesia, zirconia, silica, boehmite, and titania. These metal compounds, because they have high melting points and excellent heat resistances, are preferably used as a filler well suited to the objects of the present invention.

In a preferred aspect of the herein disclosed nonaqueous electrolyte secondary battery, the shape of the electrode active material incorporated in the aforementioned electrode is spherical or oval spherical. The application of the structure of the present invention is particularly useful with a spherical or oval spherical electrode active material because such an electrode active material readily penetrates into the filler layer.

In a preferred aspect of the herein disclosed nonaqueous electrolyte secondary battery, the electrode facing the filler layer is the positive electrode. This positive electrode has, as a positive electrode active material, a lithium transition metal complex oxide that contains at least one metal element selected from the group consisting of nickel, cobalt, and manganese. The above-referenced effects can be expressed particularly well in this case.

In a preferred aspect of the herein disclosed nonaqueous electrolyte secondary battery, the positive electrode is a positive electrode sheet having a positive electrode active material layer on a long sheet-shaped positive electrode current collector; the negative electrode is a negative electrode sheet having a negative electrode active material layer on a long sheet-shaped negative electrode current collector; and the separator is a long sheet-shaped separator sheet. In addition, it has a wound electrode assembly provided by winding this positive electrode sheet and negative electrode sheet in the length direction with the separator sheet interposed therebetween. The present invention is particularly electively applied to a nonaqueous electrolyte secondary battery having such a wound electrode assembly because the generation of a leakage current due to the sinking of the electrode active material into the filler layer is particularly prone to occur in such a nonaqueous electrolyte secondary battery.

The present invention also provides a battery pack in order to realize the objects described above. This battery pack is a battery pack constructed by the serial connection of a plurality of nonaqueous electrolyte secondary batteries serving as single batteries. Each of the nonaqueous electrolyte secondary batteries is provided with: an electrode assembly that has a structure in which a positive electrode and a negative electrode are stacked with a separator interposed therebetween; and a battery case that houses the electrode assembly and a nonaqueous electrolyte (typically a liquid electrolyte, for example, a nonaqueous electrolyte solution). A porous filler layer is formed between the separator and the positive electrode and/or the negative electrode, and this filler layer contains a filler made of an inorganic material and also contains a binder. In addition, the relationship T>D holds where T is an average thickness of the filler layer and D is an average particle diameter of the electrode active material present in the electrode facing the filler layer. The individual nonaqueous electrolyte secondary batteries constituting this battery pack are arrayed in the stacking direction of the electrode assembly and are retained with each other in this array direction, and a retaining pressure applied to a surface of the battery case is set to at least 0.1 MPa.

In a battery pack having this structure, the plurality of nonaqueous electrolyte secondary batteries that have been arrayed in the stacking direction of the stack-structured electrode assembly are retained in a state in which a load is applied in this array direction, and, in combination with this, a pressure adapted to the objects of the present invention can be applied along the stacking direction to the electrode assembly within the battery case. Furthermore, because a structure is set up in which the average thickness T of the filler layer is larger than the average particle diameter D of the electrode active material, a battery pack can be provided in which the leakage current production induced by penetration of the electrode active material into the filler layer can be suppressed.

In a preferred aspect of the herein disclosed battery pack, the battery case is a battery case made of aluminum or aluminum alloy (typically with a thickness of not more than 2 mm, for example, approximately 0.3 mm to 1 mm). Aluminum and aluminum alloys are relatively light weight materials that are easily deformed by the retaining pressure applied when retention is carried out, and as a consequence the retaining pressure applied when retention is carried out can be suitably applied to the electrode assembly in the battery case.

All of the herein disclosed nonaqueous electrolyte secondary batteries, because, for example, they exhibit excellent output characteristics and can provide a suppression of the leakage current, are well suited as a nonaqueous electrolyte secondary battery (typically a lithium secondary battery) for installation in a vehicle, for example, an automobile. Accordingly, the present invention also provides, for example, a vehicle (for example, an automobile) in which the nonaqueous electrolyte secondary battery (possibly in the form of a battery pack in which a plurality of the nonaqueous electrolyte secondary batteries are connected) is installed as a drive power source (typically a drive power source for a hybrid vehicle or an electric vehicle).

DESCRIPTION OF EMBODIMENTS

Embodiments according to the present invention are described in the following with reference to the drawings. In the following description of the drawings, members and positions that exercise the same function are assigned the same reference symbol. The dimensional relationships (length, width, thickness, and so forth) in the individual drawings do not reflect actual dimensional relationships. Matters required for the execution of the invention but not particularly described in this Description (for example, the method of producing the positive electrode active material, the method of producing the negative electrode active material, the structure of and method of producing the separator and electrolyte, general technology related to the fabrication of nonaqueous electrolyte secondary batteries and other batteries, and so forth) can be understood as design matters for the individual skilled in the art based on the conventional art in the pertinent field.

While an embodiment of the present invention is described in detail in the following using a lithium secondary battery as an example, this should not be construed as a particular limitation. The structure of the lithium secondary battery according to this embodiment is shown schematically in FIG. 1.

Figure 1:
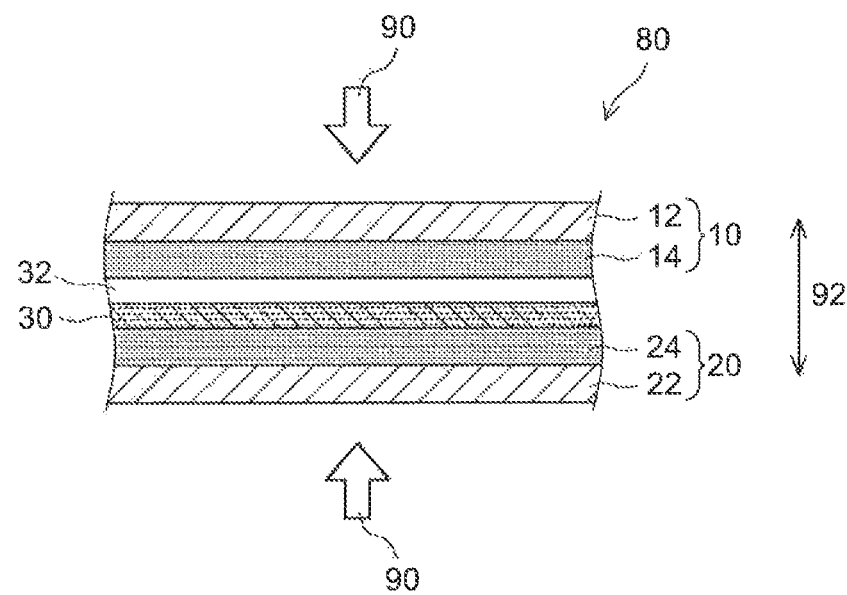
FIG. 1 is a cross-sectional view that schematically shows the relevant region of an electrode assembly according to an embodiment of the present invention.

As shown in FIG. 1, the lithium secondary battery according to this embodiment is provided with an electrode assembly 80 that has a structure in which a positive electrode 10 is stacked with a negative electrode 20 with a separator 30 interposed therebetween. The electrode assembly 80 is constructed of prescribed battery constituent materials (the respective active materials for the positive electrode and the negative electrode, the respective current collectors for the positive electrode and the negative electrode, the separator, and so forth) that are the same as for typical lithium secondary batteries. In this embodiment, at the positive electrode 10, a positive electrode active material layer 14 containing a positive electrode active material is formed on a positive electrode current collector 12 (of aluminum in the present case). In addition, at the negative electrode 20, a negative electrode active material layer 24 containing a negative electrode active material is formed on a negative electrode current collector 22 (of copper in the present case).

A porous filler layer 32 is formed between the separator 30 and the positive electrode 10 and/or the negative electrode 20. In this embodiment, the filler layer 32 is disposed on only one side of the separator 30 and is disposed at the interface between the positive electrode 10 and the separator 30. This filler layer 32 contains a filler made of an inorganic material (for example, a metal oxide powder, e.g., alumina) and also contains a binder. The binder functions to anchor the filler to the surface of the separator 30 and also to adhere the filler particles to each other. Numerous voids are formed between neighboring filler particles in those locations not adhered by the binder. A satisfactory battery output can be obtained by bringing about the residence of the nonaqueous electrolyte solution in these voids (by inducing the permeation of the nonaqueous electrolyte solution into the filler layer 32).

A pressure 90 is applied to the electrode assembly 80 along the stacking direction 92 of this electrode assembly 80. A larger distance between the positive electrode 10 and the negative electrode 20 can cause an increase in the battery resistance, but the application of the pressure 90 to the electrode assembly 80 can maintain a prescribed constant distance between the positive electrode and the negative electrode, and can thereby suppress the decline in the battery output. For example, the pressure applied to the electrode assembly 80 along the stacking direction is suitably about at least 0.1 MPa and is preferably at least 0.2 MPa and particularly preferably at least 0.3 MPa. When the pressure applied to the electrode assembly 80 in the stacking direction is smaller than 0.1 MPa, a large distance can occur between the positive electrode and the negative electrode, and the battery resistance may increase (for example, a high initial resistance may occur). When, on the other hand, the pressure applied to the electrode assembly 80 along the stacking direction exceeds 3 MPa, the holes in the separator 30 are crushed by this pressure, and the amount of resident electrolyte solution (ionic permeability) may be reduced. For example, viewed from the standpoint of securing a high output, the pressure applied to the electrode assembly 80 is in the range from 0.1 MPa to 2.5 MPa and is preferably in the range from 0.3 MPa to 2 MPa.

When the filler layer 32 has an unsuitable thickness in a battery in which pressure is applied to the electrode assembly 80 as described above, the generation of a leakage current between the positive electrode and the negative electrode may occur when the separator 30 has undergone melting during a high-temperature episode. That is, as shown in FIGS. 3(a) and 3(b), when the average thickness T of the filler layer 32 is smaller than the average particle diameter D of the positive electrode active material 15, and when the separator 30 has undergone melting during a high-temperature episode due to the pressure applied to the electrode assembly 80, the positive electrode active material 15 penetrates into the filler layer 32 and may traverse the filler layer 32. A leakage current (short-circuit current) may ultimately be generated because the insulation between the positive electrode and the negative electrode cannot be maintained when the positive electrode active material 15 traverses the filler layer 32, in contrast, this leakage current generation can be effectively suppressed by the favorable regulation in this embodiment of the average thickness T of the filler layer 32 and the average particle diameter D of the positive electrode active material 15. That is, as shown in FIG. 2(*a*), the relationship T>D holds for the battery according to this embodiment where T is the average thickness of the filler layer 32 and D is the average particle diameter of the positive electrode active material 15 present in the positive electrode 10 that faces the filler layer 32.

Figure 2:
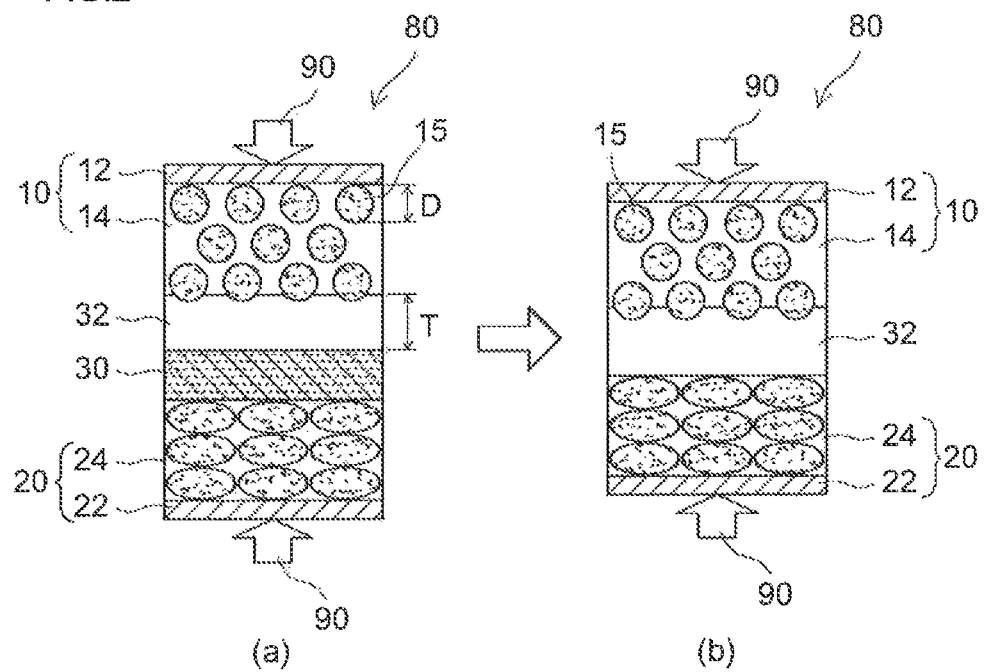
FIG. 2 is a schematic view for describing the relationship between the average thickness of the filler layer and the average particle diameter of the positive electrode active material.
Figure 3:
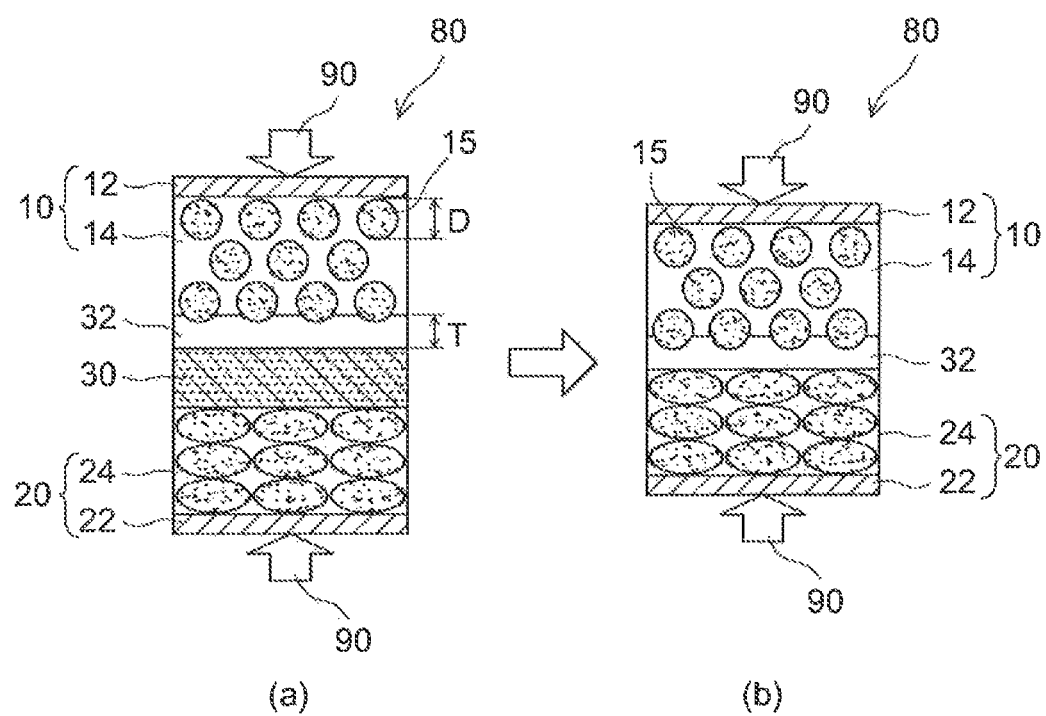
FIG. 3 is a schematic view for describing the relationship between the average thickness of the filler layer and the average particle diameter of the positive electrode active material.

As shown in FIG. 2(*b*), by setting up such a structure in which the average thickness T of the filler layer 32 is larger than the average particle diameter D of the positive electrode active material 15, short circuiting between the positive electrode and the negative electrode can be avoided even when the positive electrode active material 15 penetrates into the filler layer 32 due to the pressure applied to the electrode assembly 80, and the generation of a leakage current between the positive electrode and the negative electrode can thereby be suppressed. That is, this structure can provide a lithium secondary battery in which the leakage current generation induced by penetration of the positive electrode active material 15 into the filler layer 32 can be suppressed even in a high-temperature environment where the separator 30 melts.

The average thickness T of the herein disclosed filler layer 32 should be larger than the average particle diameter D of the positive electrode active material, and a suitable thickness can be selected in conformity to the structure of the battery. It is generally suitably at least 2 µm and is preferably at least 4 µm, more preferably at least 6 µm, even more preferably at least 8 µm, and particularly preferably at least 9 µm. When the thickness of the filler layer 32 is too small, the short circuit-preventing effect may be reduced and the amount of the electrolyte solution that can be retained may decline. When, on the other hand, the thickness of the filler layer 32 is too large, the filler layer 32 will then have a large electrical resistance and the battery characteristics (charge/discharge characteristics and so forth) may be reduced. As a consequence, generally the placement is preferred of a filler layer 32 that has an average thickness of approximately no more than 20 µm (preferably no more than 15 µm and more preferably no more than 10 µm).

The average particle diameter of the herein disclosed positive electrode active material 15 should be smaller than the average thickness of the filler layer 32, and a suitable particle diameter can be selected in conformity to the structure of the battery. The use of a positive electrode active material substantially constituted of secondary particles having an average particle diameter in the range approximately from 0.1 µm to 20 µm is generally suitable, while approximately 0.1 µm to 10 µm is preferred, approximately 0.1 µm to 8.5 µm is more preferred, approximately 0.1 µm to 6 µm is even more preferred, and approximately 0.1 µm to 5.5 µm is particularly preferred, and not more than approximately 3 µm is also favorable. When the particle diameter of the positive electrode active material is too large, the positive electrode active material will then have a small specific surface area. For this reason, the battery performance may tend to decline. When, on the other hand, the particle diameter of the positive electrode active material is too small, bulkiness appears and the productivity is impaired, or secondary reactions within the battery are increased and the service life deteriorates. As a consequence, the use of a positive electrode active material that has an average particle diameter of approximately at least 0.1 µm (preferably at least 1 µm) is preferred.

The following are preferred examples of the herein disclosed filler layer 32 and positive electrode active material 15: a filler layer with an average thickness of at least 6 µm and a positive electrode active material with an average particle diameter of not more than 5.2 µm; a filler layer with an average thickness of at least 8 µm and a positive electrode active material with an average particle diameter of not more than 5.2 µm; and a filler layer with an average thickness of at least 9 µm and a positive electrode active material with an average particle diameter of not more than 8.3 µm. The leakage current generation induced by the penetration of the positive electrode active material into the filler layer can be effectively inhibited by having the average thickness of the filler layer and the average particle diameter of the positive electrode active material in these prescribed ranges. A particularly preferred embodiment can be exemplified by a structure in which the average thickness T of the filler layer is at least 0.5 µm larger than the average particle diameter D of the positive electrode active material (preferably at least 0.7 µm larger, more preferably at least 2 µm larger, and particularly preferably at least 2.5 µm larger).

<The Lithium Secondary Battery>

The overall structure of the lithium secondary battery 100 according to this embodiment is described below with reference to the schematic views shown in FIGS. 4 to 7. This lithium secondary battery 100 has a structure in which an electrode assembly (wound electrode assembly) 80—comprising a long positive electrode sheet 10 and a long negative electrode sheet 20 wound with two long separator sheets 30,30 interposed therebetween—is housed along with a nonaqueous electrolyte (nonaqueous electrolyte solution), which is not shown, in a battery case 50 having a shape (rectangular shape) that can accommodate the wound electrode assembly 80.

The battery case 50 is provided with a rectangular case main body 52 that has a bottom and that is open at the upper end and with a lid 54 that closes this opening. Metals such as, for example, aluminum, steel, and Ni-plated SUS, are preferably used as the material constituting the battery case 50 (aluminum is used in this embodiment). Or, the battery case 50 may be provided by molding a resin such as, for example, PPS, polyimide resin, and so forth. The following are disposed in the upper surface of the battery case 50 (i.e., the lid 54): a positive electrode terminal 70 that electrically connects with the positive electrode 10 of the wound electrode assembly 80, and a negative electrode terminal 72 that electrically connects with the negative electrode 20 of the wound electrode assembly 80.

Figure 6:
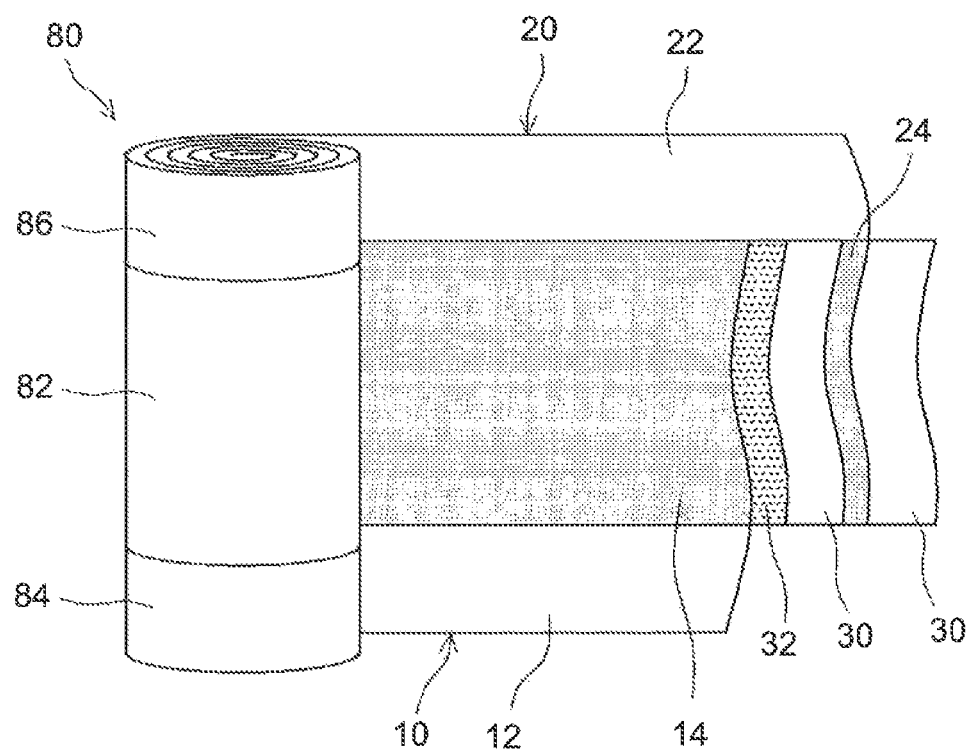
FIG. 6 is a schematic view for describing a wound electrode assembly according to an embodiment of the present invention.
Figure 7:
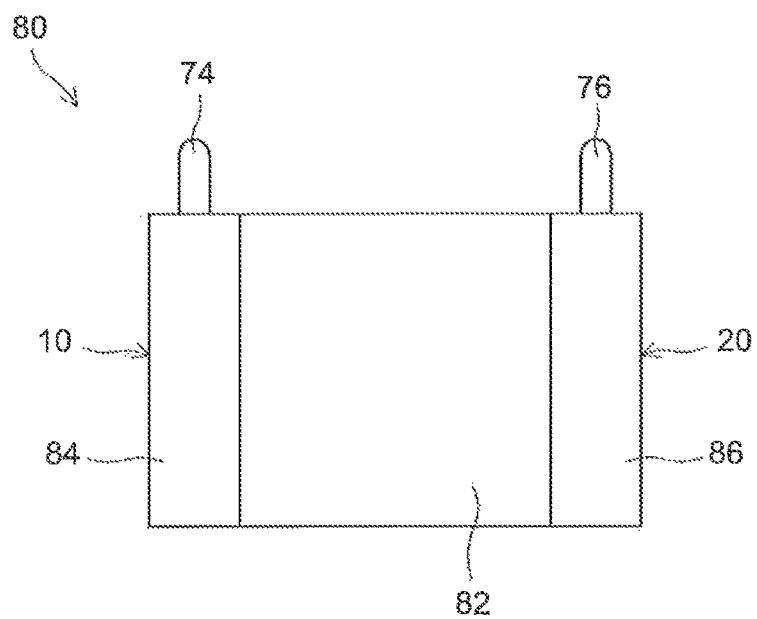
FIG. 7 is a front view that schematically shows the wound electrode assembly according to an embodiment of the present invention.

As shown in FIG. 6, the wound electrode assembly 80 according to this embodiment has a long (strip-shaped) sheet structure in the steps prior to assembly of the wound electrode assembly 80.

The positive electrode sheet 10 has a structure in which a positive electrode active material layer 14 containing a positive electrode active material is supported on both sides of a long sheet-shaped positive electrode current collector 12. However, the positive electrode active material layer 14 is not attached at one edge (the lower edge region in FIG. 6) along the margin, considered in the width direction, of the positive electrode sheet 10, thereby forming a positive electrode active material layer-free region in which the positive electrode current collector 12 is exposed over a constant width.

Just as with the positive electrode sheet 10, the negative electrode sheet 20 has a structure in which a negative electrode active material layer 24 containing a negative electrode active material is supported on both sides of a long sheet-shaped negative electrode current collector 22. However, the negative electrode active material layer 24 is not attached at one edge the upper edge region in FIG. 6) along the margin, considered in the width direction, of the negative electrode sheet 20, thereby forming a negative electrode active material layer-free region in which the negative electrode current collector 22 is exposed over a constant width.

When the wound electrode assembly 80 is fabricated, as shown in FIG. 6 a positive electrode sheet 10 is stacked with a negative electrode sheet 20 with two separator sheets 30,30 interposed therebetween. When this is done, stacking is carried out with the positive electrode sheet 10 and the negative electrode sheet 20 shifted somewhat in the width direction so the positive electrode active material layer-free region on the positive electrode sheet 10 and the negative electrode active material layer-free region on the negative electrode sheet 20 extend, respectively, from the two sides, considered in the width direction, of the separator sheets 30,30. This positive electrode sheet 10 and negative electrode sheet 20 are stacked with the separator sheets 30,30 interposed therebetween, and, while applying tension to the individual sheets 10, 20, and 30, the wound electrode assembly 80 can be fabricated by winding along the long direction of these sheets.

A wound core region 82 (i.e., the region where the positive electrode active material layer 14 of the positive electrode sheet 10, the negative electrode active material layer 24 of the negative electrode sheet 20, and the separator sheets 30 are densely layered) is formed in the central region considered in the direction of the winding axis of the wound electrode assembly 80. In addition, the electrode active material layer-free regions on the positive electrode sheet 10 and the negative electrode sheet 20 extend to the outside from the wound core region 82, respectively, at the two edges considered in the direction of the winding axis of the wound electrode assembly 80. A positive electrode current collector plate 74 and a negative electrode current collector plate 76 are attached, respectively, to the protruding region 84 (i.e., the region where the positive electrode active material layer 14 is not formed) on the positive electrode side and to the protruding region 86 (i.e., the region where the negative electrode active material layer 24 is not formed) on the negative electrode side and are electrically connected to, respectively, the positive electrode terminal 70 and the negative electrode terminal 72.

Except for the favorable regulation of the average thickness of the filler layer 32 and the average particle diameter of the positive electrode active material 15 that is used in the electrode assembly 80, the structural elements constituting the wound electrode assembly 80 under consideration may be the same as in a wound electrode assembly in a conventional lithium secondary battery and there are no particular limitations thereon.

<The Positive Electrode Sheet>

The positive electrode sheet 10 can be formed, for example, by applying, on a long positive electrode current collector 12, a positive electrode active material layer 14 in which the major component is a positive electrode active material for use in lithium secondary batteries. An aluminum foil or the foil of another metal suitable for use in positive electrodes is favorably used as the positive electrode current collector 12. A sheet-shaped aluminum positive electrode current collector 12 is used in this embodiment. For example, an aluminum sheet having a thickness of about 10 µm to 30 µm can be advantageously used.

The positive electrode active material layer 14 is constituted of a positive electrode active material and other positive electrode active material layer-forming components that are used as necessary (for example, a binder, an electroconductive material, and so forth). One or two or more of the materials heretofore used in lithium secondary batteries can be used as the positive electrode active material without particular limitation. A preferred scope for the herein disclosed art can be exemplified by positive electrode active materials in which the major component is an oxide that contains lithium and a transition metal element as its constituent metal elements (a lithium transition metal oxide), for example, lithium nickel oxide ($LiNiO_2$), lithium cobalt oxide ($LiCoO_2$), lithium manganese oxide ($LiMn_2O_4$), and so forth. This also applies to positive electrode active materials in which the major component is a lithium nickel cobalt manganese complex oxide (for example, $LiNi_{1/3}Co_{1/3}Mn_{1/3}O_2$) (typically a positive electrode active material composed substantially of a lithium nickel cobalt manganese complex oxide). An olivine-type lithium phosphate having the general formula $LiMPO_4$ (M is at least one or more elements selected from Co, Ni, Mn, and Fe; for example, $LiFeO_4$ and $LiMnPO_4$) may also be used as the positive electrode active material under consideration.

There are no particular limitations on the shape (external shape) of this positive electrode active material, but, viewed from the perspective of the strength, ease of production, and so forth, generally the use is preferred of a spherical or oval spherical positive electrode active material. The application of the present invention is particularly effective in the case of a spherical or oval spherical positive electrode active material because such a positive electrode active material is easily pushed into the filler layer 32 by the pressure applied to the electrode assembly 80.

As necessary, the positive electrode active material layer 14 can contain one or two or more of the materials that can be used as constituent components of the positive electrode active material layer in ordinary lithium secondary batteries. An electroconductive material is an example of such a material. The use is preferred for such an electroconductive material of a carbon material, e.g., carbon powder or a carbon fiber. Or, an electroconductive metal powder, e.g., nickel powder, may be used. The various polymers that can function as a binder for the previously described constituent materials are an example of another material that can be used as a component of the positive electrode active material layer.

The proportion of the positive electrode active material in the positive electrode active material layer as a whole is not particularly limited, but is preferably approximately at least 75 mass % (typically 75 to 99 mass %) and is preferably approximately 85 to 99 mass %. In the case of a positive electrode active material layer having a composition that includes an electroconductive material, the proportion of the electroconductive material in the positive electrode active material layer can be, for example, 1 to 20 mass % and is preferably approximately 1 to 10 mass %. In addition, when positive electrode active material layer-forming components other than the positive electrode active material and electroconductive material are incorporated (for example, a polymer), the total content of these optional components is preferably not more than approximately 7 mass % and is preferably not more than approximately 5 mass % (for example, approximately 1 to 5 mass %).

The following method is preferably used to form the positive electrode active material layer 14: the positive electrode active material (typically a particulate) and the other positive electrode active material layer-forming components are dispersed in a suitable solvent (preferably a water-based solvent) to produce a paste for forming the positive electrode active material layer; this paste is coated as a strip or ribbon on one or bath sides (both sides here) of the positive electrode current collector 12; and drying is performed. After the paste far forming the positive electrode active material layer has been dried, the thickness and density of the positive electrode active material layer 14 can be adjusted by the execution of a suitable pressing treatment (for example, the various heretofore known pressing methods, e.g., roll pressing, platen pressing, and so forth, can be used).

<The Negative Electrode Sheet>

Just as with the positive electrode sheet 10, the negative electrode sheet 20 is also formed by attaching a negative electrode active material layer 24 to both sides of a long sheet-shaped negative electrode current collector 22 foil. However, the negative electrode active material layer 24 is not attached at one edge along the margin, considered in the width direction, of the sheet-shaped electrode assembly, thereby exposing the negative electrode current collector 22 over a constant width.

Copper foil (this embodiment) or another metal foil suitable for negative electrodes is preferably used for the negative electrode current collector 22. A sheet-shaped copper negative electrode current collector 22 is used in this embodiment. For example, a copper sheet having a thickness of about 5 µm to 30 µm can be favorably used.

The negative electrode active material layer 24 is constituted of a negative electrode active material and other negative electrode active material layer-forming components (for example, a binder) that are used as necessary. For the negative electrode active material, one or two or more of the materials heretofore used in lithium secondary batteries can be used without particular limitation. Favorable examples here are carbonaceous materials such as graphite carbon, amorphous carbon, and so forth (graphite is used in this embodiment) and lithium-containing transition metal oxides and transition metal nitrides. The amount of the negative electrode active material incorporated in the negative electrode active material layer is not particularly limited, but is preferably about 90 mass % to 99 mass % and is more preferably about 95 mass % to 99 mass %.

<The Separator Sheet>

The separator sheet 30 is described in the following. For example, polyolefin resins, e.g., polyethylene (PE), polypropylene (PP), and so forth, can be favorably used as the material of the separator sheet 30. The structure of the separator 30 may be a single-layer structure or may be a multilayer structure. In the present case, the separator sheet 30 is composed of polyethylene (PE) resin. A homopolymer of ethylene is preferably used as the polyethylene (PE) resin. The polyethylene (PE) resin may also be a resin that contains at least 50 mass % repeat units derived from ethylene, a copolymer provided by polymerizing ethylene with a copolymerizable α-olefin, or a copolymer provided by polymerizing ethylene with at least one copolymerizable monomer. Propylene is an example of the α-olefin. The other monomer can be exemplified by conjugated dimes (for example, butadiene) and acrylic acid.

The separator sheet 30 is preferably constructed of a PE that has a shutdown temperature of about 120° C. to 140° C. (typically 125° C. to 135° C.). This shutdown temperature should be well below the heat-resistance temperature (for example, approximately at least 200° C.) of the battery. Such a PE can be exemplified by the polyesters generally known as high-density polyethylenes and linear low-density polyethylenes. Or, various branched medium-density and low-density polyethylenes may be used. As necessary, an additive or additives may also be incorporated, such as various plasticizers, antioxidants, and so forth.

A monoaxially stretched or biaxially stretched porous resin sheet can preferably be used as the separator sheet 30. Within this sphere, porous resin sheets that have been subjected to a monoaxial stretch in the longitudinal direction (machine direction or MD direction) are particularly preferred because they exhibit little heat shrinkage in the width direction while providing a suitable strength. For example, when a separator is used that has such a resin sheet that has been monoaxially stretched in the longitudinal direction, heat shrinkage in the length direction can also be suppressed in a configuration in which it is wound with a long sheet-shaped positive electrode and negative electrode. Accordingly, a porous resin sheet that has been monoaxially stretched in the longitudinal direction is particularly suitable as a material for the separator constituting the wound electrode assembly under consideration.

The thickness of the separator sheet 30 is preferably about 10 µm to 30 µm and more preferably about 15 µm to 25 µm. When the thickness of the separator sheet 30 is too large, the ionic conductivity of the separator sheet 30 may undergo a decline. When, on the other hand, the thickness of the separator 30 is too small, the film may undergo rupture. The thickness of the separator sheet 30 can be determined by image analysis of the image provided by photography using a scanning electron microscope (SEM).

The porosity of the separator sheet 30 is preferably about 20% to 60% and, for example, is more preferably about 30% to 50%. When the porosity of the separator sheet 30 is too large, the strength will be inadequate and film rupture may then readily occur. When, on the other hand, the porosity of the separator sheet 30 is too low, little electrolyte solution can then reside in the separator sheet 30 and the ionic conductivity may decline.

In the present case, the separator sheet 30 is constituted of a monolayer structure having a PE layer, but it may also be a resin sheet with a multilayer structure. For example, it may have a three-layer structure of a PP layer, a PE layer laminated on the PP layer, and a PP layer laminated on the PE layer. In this case, the filler layer 32 can be layered on the PP layer. The number of layers in a resin sheet having a multilayer structure is not limited to three and may be two or four or more.

<The Filler Layer>

The filler layer 32 layered on one side of the separator sheet 30 contains a filler made of an inorganic material and also contains a binder. The filler layer 32 is described in the following. In this embodiment, the filler layer 32 is formed in the region facing the positive electrode active material layer 14 of the positive electrode 10.

An inorganic material having a high electrical insulating performance and a melting point (for example, at least 190° C.) higher than that of the separator sheet 30 is favorably used as the filler (packing) used in the filler layer 32. This material can be, for example, the oxide, hydroxide, nitride, and so forth, of a metal. The form of the inorganic material can be particulate, fibrous, flake, and so forth. The use of a particulate inorganic material is generally preferred. A particulate inorganic oxide or a particulate inorganic hydroxide is advantageously used. For example, one or two or more types of inorganic compounds selected from alumina, boehmite, magnesia, titania, silica, zirconia, and so forth, produced in a particulate form can be used. Particularly preferred inorganic compounds can be exemplified by alumina, magnesia, zirconia, silica, boehmite, and titania. The heat resistance and mechanical strength can be favorably ensured by the use of these inorganic compounds. The average particle diameter of this particulate inorganic compound can be, for example, about 0.5 µm to 2 µm.

When the coating material for forming the filler layer is a water-based solvent (a solution that uses water, or that uses a mixed solvent in which water is the major component, as the dispersion medium for the binder), the binder used in the filler layer 32 can be a polymer that disperses or dissolves in water-based solvents. Polymers that disperse or dissolve in water-based solvents can be exemplified by acrylic resins. In addition to acrylic resins, styrene-butadiene rubber (SBR), polyolefin resins such as polyethylene (PE), carboxymethyl cellulose (CMC), polytetrafluoroethylene (PTFE), and so forth, can be used. Or, a polyvinylidene fluoride (PVdF) resin can also be used. A single one of these polymers may be used by itself or two or more may be used in combination. Among the preceding, the use of an acrylic resin is preferred. While there is no particular limitation on the form of the binder, those that are particulate (a powder) may be used as such or may be used converted into a solution or emulsion. Different forms may be used for each when two or more binders are used.

The proportion of the filler in the filler layer 32 as a whole is not particularly limited, but is preferably approximately at least 90 mass % (typically 95 mass % to 99 mass %) and is preferably approximately 97 mass % to 99 mass %. In addition, the proportion of the binder in the filler layer 32 is preferably not more than approximately 7 mass % and is preferably not more than approximately 5 mass % (for example, approximately 0.5 mass % to 3 mass %). When a filler layer-forming component (for example, a thickener) other than the filler and binder is incorporated, the total content of these optional components is preferably not more than approximately 3 mass % and is preferably not more than approximately 2 mass % (for example, approximately 0.5 mass % to 1 mass %). When the proportion of the binder is too low, anchoring of the filler layer 32 may decline and/or the strength (shape retention) of the filler layer 32 itself may decline, and defects such as, for example, cracking and exfoliation, may then occur. When the proportion of the binder is too large, the porosity of the filler layer 32 may be inadequate and the ionic permeability of the filler layer 32 may be reduced (resulting in a rise in the resistance of the secondary battery fabricated using this filler layer 32).

The porosity of the filler layer 32 is preferably about 40% to 70% and, for example, is more preferably about 50% to 60%. When the porosity of the filler layer 32 is too high, the strength will be deficient and film rupture can readily occur. When, on the other hand, the porosity of the filler layer 32 is too low, little electrolyte solution can be retained in the filler layer 32 and the ionic conductivity may be reduced.

The mass of the filler layer 32 per unit area of the separator sheet 30 (the areal mass) is preferably about 0.3 g/cm$^2$ to 2 g/cm$^2$ and is more preferably about 0.5 g/cm$^2$ to 1.5 g/cm$^2$. When the mass (areal mass) of the filler layer 32 is too low, there may be little inhibiting effect on the heat shrinkage of the separator sheet 30 and/or the short circuit-preventing effect may be reduced. When, on the other hand, the mass (areal mass) of the filler layer 32 is too large, the battery resistance is increased and the battery characteristics (charge/discharge characteristics and so forth) may be reduced.

Viewed from the standpoint of bringing about a balanced co-existence between stopping the short circuiting and an excellent ionic permeability, the total thickness of the filler layer 32 and the separator sheet 30 is advantageously at least about 15 µm (for example, 15 µm to 40 µm) and is preferably at least 20 µm (for example, 20 µm to 40 µm) and particularly preferably at least 24 µm (for example, 24 µm to 40 µm).

The method for forming the filler layer 32 according to this embodiment is described in the following. A paste (or a slurry or ink; this also applies in the following) prepared by mixing and dispersing the filler, binder, and solvent is used as the filler layer-forming coating material for forming the filler layer 32. The filler layer 32 can be formed by coating this paste-form coating material at a suitable rate on a surface of the separator sheet 30 and drying.

The solvent used in the filler layer-forming coating material can be exemplified by water and mixed solvents in which water is the major component. One or two or more types of organic solvents that are uniformly miscible with water (lower alcohols, lower ketones, and so forth) can be suitably selected and used as the solvent other than water in such a mixed solvent. Or, it may be an organic solvent such as N-methylpyrrolidone (NMP), pyrrolidone, methyl ethyl ketone, methyl isobutyl ketone, cyclohexanone, toluene, dimethylformamide, or dimethylacetamide, or a combination of two or more of the preceding. The content of the solvent in the filler layer-forming coating material is not particularly limited, but is preferably 40 to 90 mass % of the coating material as a whole and is particularly preferably about 50 mass % of the coating material as a whole.

In addition to the filler and binder, the filler layer-forming coating material may contain one or two or more materials that can be used as necessary. Such a material can be exemplified by polymers that can function as a thickener for the inorganic filler layer-forming coating material. In the particular case of use of a water-based solvent, the incorporation is preferred of a polymer that can function as such a thickener. Carboxymethyl cellulose (CMC) or polyethylene oxide (PEO) is preferably used as this polymer that can function as a thickener.

The process for mixing the filler and binder into the solvent can be carried out using a suitable mixer/kneader, e.g., a DISPER MILL, CLEARMIX, FILMIX, ball mill, HOMO DISPER, ultrasound disperser, and so forth. The filler layer 32 can be formed by coating the filler layer-forming coating material on a surface of the separator sheet 30 and drying.

The process of coating the filler layer-forming coating material on a surface of the separator sheet 30 can use an ordinary conventional coating means without particular limitation. For example, coating can be carried out by coating a prescribed amount of the filler layer-forming coating material in a uniform thickness on one side of the separator sheet 30 using a suitable applicator (e.g., a gravure coater, slit coater, die coater, comma coater, dip coater, and so forth). The solvent in the filler layer-forming coating material is then removed by drying (drying is typically carried out at a temperature below the melting point of the separator sheet 30, for example, at or below 110° C., for example, at a temperature from 50 to 80° C.) the coated material with a suitable drying means. The filler layer 32 containing the filler and binder can be formed by removal of the solvent from the filler layer-forming coating material.

Figure 4:
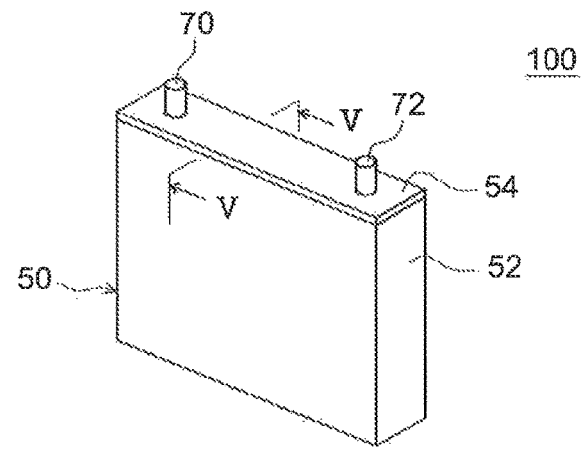
FIG. 4 is a perspective view that schematically shows a nonaqueous electrolyte secondary battery according to an embodiment of the present invention.
Figure 5:
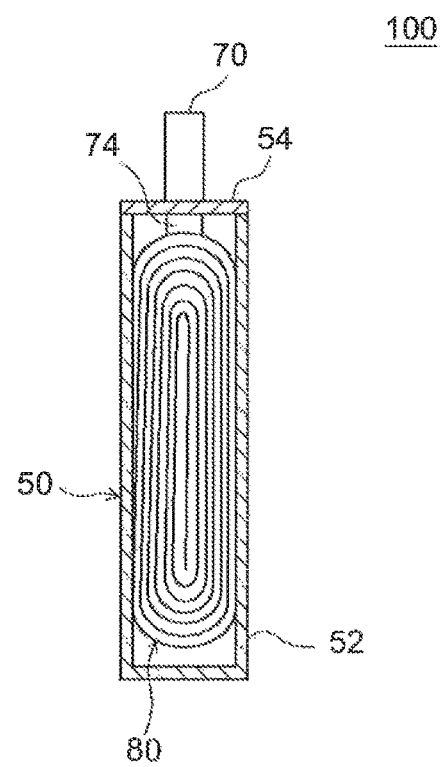
FIG. 5 is a cross-sectional view that schematically shows the V-V cross section in FIG. 4.

The thusly obtained filler layer 32-bearing separator sheet 30 is supplied to the previously described step for forming the wound electrode assembly. In the step for forming the wound electrode assembly, two separator sheets 30 (filler layer 32-bearing separator sheets 30) and the separately prepared positive electrode sheet 10 and negative electrode sheet 20 are stacked as shown in FIG. 6 and a wound electrode assembly 80 for use in a wound lithium secondary battery is then produced. At this point the filler layer 32 and the positive electrode sheet 10 should be disposed facing each other. As shown in FIG. 4 and FIG. 5, the wound electrode assembly 80 is housed within the case main body 52 through the opening in the upper end of this main body 52 and an electrolyte solution containing a suitable electrolyte is provided (added) into the case main body 52. The electrolyte is, for example, a lithium salt such as $LiPF_6$. For example, an electrolyte solution can be used that is prepared by dissolving a lithium salt such as $LiPF_6$ in a suitable amount (for example, a concentration of 1 M) in a nonaqueous electrolyte (nonaqueous electrolyte solution) such as a mixed solvent of ethylene carbonate, ethyl methyl carbonate, and dimethyl carbonate (for example, in a mass ratio of 3:4:3).

The assembly of the lithium secondary battery 100 according to this embodiment is then completed by sealing the opening with the lid 54, for example, by welding. The process of sealing the battery case 50 and the process of providing (adding) the electrolyte are not characteristic features of the present invention and may be performed using the same procedures used in the production of conventional lithium secondary batteries. Proceeding in this manner completes the fabrication of the lithium secondary battery 100 according to this embodiment.

The thusly fabricated lithium secondary battery 100 exhibits an excellent battery performance due to a favorable suppression of the leakage current that is induced by the penetration of the positive electrode active material into the filler layer 32. For example, a battery can be provided that satisfies at least one of the following (and preferably all of the following): excellent output characteristics, excellent safety, and low IV resistance.

Figure 8:
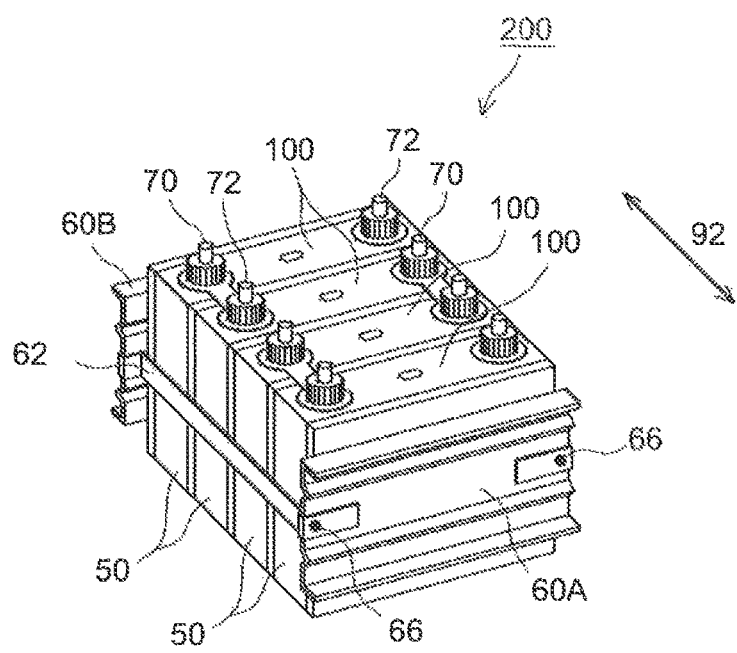
FIG. 8 is a perspective view that schematically shows a battery pack according to an embodiment of the present invention.

A battery pack 200 for realizing the objects of the present invention is explained in the following also with reference to FIG. 8 and FIG. 9. As shown in FIG. 8, this battery pack 200 is a battery pack having a structure in which a plurality of lithium secondary batteries 100 are connected in series. As shown in FIG. 1 to FIG. 7, this lithium secondary battery 100 is provided with an electrode assembly 80 having a structure in which a positive electrode 10 and a negative electrode 20 are stacked with a separator 30 interposed therebetween and is also provided with a battery case 50 that houses this electrode assembly 80 along with an electrolyte solution. In addition, a filler layer 32 is formed on the surface of the separator 30 on the side of the positive electrode 10. Moreover, as shown in FIG. 2(a), a structure is set up in which the average thickness T of the filler layer 32 is larger than the average particle diameter D of the positive electrode active material incorporated in the positive electrode 10.

The individual lithium secondary batteries 100 constituting this battery pack 200 are, as shown in FIG. 8, arrayed in the aforementioned stacking direction 92 of the electrode assembly 80 and are bundled with each other in this array direction. The retaining pressure applied to the surface of the battery case 50 (i.e., the case surface facing in the array direction) as shown in FIG. 9 is set to at least 0.1 MPa, preferably at least 0.2 MPa, and particularly preferably at least 0.3 MPa.

This retaining pressure can be set as follows. Thus, as shown in FIG. 8, a plurality of lithium secondary batteries 100 are arrayed in the stacking direction 92 and are disposed reversed from one to another such that their respective positive electrode terminals 70 and negative electrode terminals 72 alternate. In addition, a retaining member that collectively bundles the plurality of batteries 100 is deployed on the circumference of the arrayed lithium secondary batteries 100. That is, a pair of retaining plates 60A, 60B are additionally disposed at the outer sides of the batteries 100 located at the outermost sides in the battery array direction. A tightening beam 62 is installed to run between this pair of retaining plates 60A, 60B. By fastening and fixing the ends of the beam 62 to the retaining plates 60A, 60B using a screw 66, the lithium secondary batteries 100 can be retained by the application of a prescribed load (i.e., the pressure (retaining pressure) applied to the surface of the battery case 50 is at least 0.1 MPa) in the array direction thereof. A retaining load (retaining pressure 90) is applied, at a level corresponding to the degree of tightening by the beam 62, to the battery ease 50 of each battery 100 in the tightening direction (i.e., the array direction).

Figure 9:
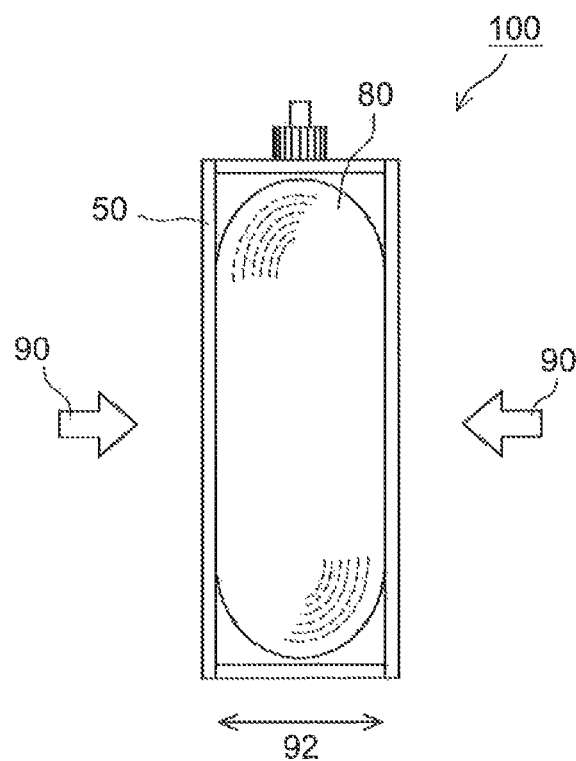
FIG. 9 is a cross-sectional view that schematically shows a cross section of a battery constituting a battery pack according to an embodiment of the present invention.

Since the battery case 50 of this embodiment as described in the preceding is constructed of an easily deformable material (aluminum in this ease) in order to reduce the weight, the retaining pressure 90 applied along the array direction of the lithium secondary batteries 100 is, as shown in FIG. 9, transmitted across the side wall of the battery case 50 to the electrode assembly 80 that is disposed in close contact with the inner wall of the battery case 50. That is, a pressure appropriate to the objects of the present invention can be applied along the stacking direction to the electrode assembly 80 within the battery case 50 by the retaining pressure applied in the tightening direction (i.e., the array direction) at a level corresponding to the degree of tightening by the beam 62.

When the battery case 50 is formed of a different material (for example, a hard material that is more resistant to deformation than aluminum), or when it is made of aluminum but formed with a greater wall thickness, an appropriate retaining pressure may be set by suitable adjustment of the degree of tightening of the beam 62 in conformity to the actual properties of the battery case, so as to apply the appropriate pressure to the electrode assembly 80 housed in the battery case 50 (i.e., the pressure (surface pressure) applied to the electrode assembly within the case is the same as the pressure applied to the electrode assembly in the case when a thin aluminum battery case is used as in this embodiment and a retaining pressure of at least 0.1 MPa is applied).

Test examples for the present invention are described below, but this should not be taken to imply that the present invention is limited to what is shown in the following test examples. Test lithium secondary batteries were fabricated in these test examples using different average thicknesses for the filler layer and different average particle diameters for the positive electrode active material. These test batteries were bundled with each other and pressure was applied to the electrode assembly, and this was followed by the execution of a heating test and evaluation of the presence/absence of a leakage current.

EXAMPLE 1

<The Filler Layer>
A coating material for forming the filler layer was prepared in this example by dispersing an α-alumina powder (average particle diameter=0.7 μm) as the filler, an acrylic polymer as the binder, and carboxymethyl cellulose as a thickener in water at a mass ratio between these materials of 96:4 as the solids fraction ratio. This coating material for forming the filler layer was coated using a gravure roll on the surface of a separator sheet (an 18 μm-thick porous polyethylene (PE) sheet was used) and was dried to form a filler layer. As shown in Table 1, in this example the average thickness of the filler layer was 6 μm and the total thickness of the filler layer and separator sheet was 24 μm. The porosity of the filler layer was 55%.

A test lithium secondary battery was fabricated using the thusly obtained filler layer-bearing separator sheet. Fabrication of the test lithium secondary battery was carried out as follows.

<The Positive Electrode Sheet>

A positive electrode active material layer paste was prepared by mixing a lithium nickel cobalt manganese complex oxide ($LiNi_{1/3}Co_{1/3}Mn_{1/3}O_2$) powder having an average particle diameter of 5.2 μm as the positive electrode active material, an acetylene black (AB) as the electroconductive material, and a polyvinylidene fluoride (PVdF) as the binder in N-methylpyrrolidone (NMP) at a mass ratio among these materials of 100:5:5. This positive electrode active material layer paste was coated as a strip on both sides of a long sheet-shaped aluminum foil (positive electrode current collector: thickness=15 μm, length=3000 mm) and was dried to produce a positive electrode sheet having a positive electrode active material layer disposed on both sides of the positive electrode current collector. After drying, pressing was performed to bring the thickness of the positive electrode sheet as a whole to 100 μm. In addition, the coating rate of the positive electrode active material layer paste was adjusted to provide approximately 30 mg/cm² (as solids) for both sides in combination.

<The Negative Electrode Sheet>

A negative electrode active material layer paste was prepared by dispersing a graphite powder as the negative electrode active material and a polyvinylidene fluoride (PVdF) as the binder in N-methylpyrrolidone (NMP) to provide a mass ratio between these materials of 100:7. This negative electrode active material layer paste was coated on both sides of a long sheet-shaped copper foil (negative electrode current collector: thickness=10 μm, length=3300 mm) to produce a negative electrode sheet in which the negative electrode active material layer was disposed on both sides of the negative electrode current collector. After drying, pressing was carried out to bring the thickness of the negative electrode sheet as a whole to 120 μm. The coating rate of the negative electrode active material layer paste was adjusted to provide approximately 15 mg/cm² (as solids) for both sides in combination.

<The Lithium Secondary Battery>

A winding was produced by winding, on a cylindrical winding core having a diameter of 30 mm, the positive electrode sheet and negative electrode sheet with two separator sheets interposed therebetween, and a flattened wound electrode assembly was produced by pressing this winding from the width direction. At this point, the filler layer formed on the surface of the separator sheet was disposed so as to face the positive electrode sheet. The thusly obtained wound electrode assembly was housed in a box-shaped battery case (an aluminum battery case was used here) together with a nonaqueous electrolyte (nonaqueous electrolyte solution) and the opening in the battery container was sealed airtight. The nonaqueous electrolyte solution used was a nonaqueous electrolyte solution that contained $LiPF_6$ as a supporting electrolyte at a concentration of approximately 1 mol/liter in a mixed solvent containing ethylene carbonate (EC), dimethyl carbonate (DMC), and ethyl methyl carbonate (EMC) in a volume ratio of 3:3:4. The test lithium secondary battery was assembled proceeding in the manner described. The fabricated test battery was bundled with 1 cm-thick aluminum plates so as to apply a pressure of 0.3 MPa to the electrode assembly housed in the battery case. The rated capacity of this lithium secondary battery is 5.5 Ah. The lithium secondary battery according to Example 1 was fabricated proceeding in the manner described.

EXAMPLE 2

A lithium secondary battery was fabricated proceeding as in Example 1, but using 8 μm for the average thickness of the filler layer and using 16 μm for the thickness of the separator sheet.

EXAMPLE 3

A lithium secondary battery was fabricated as in Example 1, but using 8.3 μm for the average particle diameter of the positive electrode active material, using 9 μm for the average thickness of the filler layer, and using 15 μm for the thickness of the separator sheet.

Comparative Example 1

A lithium secondary battery was fabricated proceeding as in Example 1, but using 4 μm for the average thickness of the filler layer and using 20 μm for the thickness of the separator sheet.

Comparative Example 2

A lithium secondary battery was fabricated proceeding as in Example 3, but using 6 μm for the average thickness of the filler layer and using 18 μm for the thickness of the separator sheet.

Reference Example

A lithium secondary battery was fabricated proceeding as in Comparative Example 1, but without bundling the battery and thus without applying pressure to the electrode assembly.

The fabrication conditions for the test batteries according to each example are shown in Table 1.

TABLE 1

| | average particle diameter of the positive electrode active material (μm) | filler layer thickness (μm) | filler layer facing electrode | separator thickness (μm) | retaining pressure (MPa) | leakage current |
|---|---|---|---|---|---|---|
| Example 1 | 5.2 | 6 | positive electrode | 18 | 0.3 | no |
| Example 2 | 5.2 | 8 | positive electrode | 16 | 0.3 | no |
| Example 3 | 8.3 | 9 | positive electrode | 15 | 0.3 | no |
| Comp. Example 1 | 5.2 | 4 | positive electrode | 20 | 0.3 | yes |
| Comp. Example 2 | 8.3 | 6 | positive electrode | 18 | 0.3 | yes |
| Reference Example | 5.2 | 4 | positive electrode | 20 | 0 | no |

<The Heating Test>

Five of the thusly fabricated test batteries from each example were prepared and a heating test was carried out on the respective batteries. In the heating test, after 4.0 V had been reached at room temperature (approximately 25° C.) at a constant current of 5.5 A (corresponded to 1 C), while charging by the constant voltage charging procedure the temperature was raised from room temperature at 5° C./minute and was held for 30 minutes at 170° C. Monitoring for leakage current was carried out during the constant voltage charging in order to check for the presence/absence of leakage current. The results are given in Table 1.

As shown in Table 1, a leakage current was produced in the batteries according to Comparative Examples 1 and 2, which had an average thickness for the filler layer that was smaller than the average particle diameter of the positive electrode active material. The inference here is that short-circuiting between the positive electrode and the negative electrode and the flow of leakage current between the positive electrode and the negative electrode occurred due to melting of the PE separator by the heating to 170° C. in combination with the positive electrode active material being pressed into the filler layer by the retaining pressure. In contrast, in the batteries according to Examples 1 to 3, short-circuiting between the positive electrode and the negative electrode was avoided and the leakage current was effectively suppressed because the average thickness of the filler layer was larger than the average particle diameter of the positive electrode active material. These results confirmed that, in a battery in which a retaining pressure is applied to the electrode assembly, the leakage current can be suppressed by having the average thickness of the filler layer be larger than the average particle diameter of the positive electrode active material.

A leakage current was not generated in the Reference Example battery even though the average thickness of its filler layer was smaller than the average particle diameter of the positive electrode active material. The inference here is that, because a retaining pressure was not applied to the electrode assembly in this battery, penetration of the positive electrode active material into the filler layer did not occur and leakage current therefore did not flow. It can be confirmed from this that the effect due to the structure of the present invention, i.e., an inhibition of leakage current generation by having the average thickness of the filler layer be larger than the average particle diameter of the positive electrode active material, is manifested particularly well in batteries in which a retaining pressure is applied to the electrode assembly.

The present invention has been described in the preceding using preferred embodiments and examples, but this description is not a limitation and various modifications are certainly possible. For example, the battery type is not limited to the lithium secondary battery described in the preceding and includes batteries with various architectures having different constituent materials for the electrode assembly and/or having different electrolytes, for example, nickel hydride batteries, nickel cadmium batteries, and electric double-layer capacitors.

In addition, as long as the herein disclosed preferred retaining pressure, filler layer, and positive electrode active material are used, there are no particular limitations on the shape (external shape and size) of the nonaqueous electrolyte secondary battery that is fabricated. It may be a thin sheet type in which the outer enclosure is, for example, a laminate film; it may be a battery in which the outer battery case has a cylindrical shape or a rectangular parallelepiped shape; or it may have a small button configuration.

The embodiments described above use the example of the formation of the filler layer 32 on the surface of the separator 30 on its positive electrode side, which is the interface between the separator 30 and the positive electrode 10, but there is no limitation to this. For example, the filler layer 32 may be formed on the surface of the positive electrode 10 (typically the surface of the positive electrode active material layer 14). In addition, the filler layer 32 may be formed on the negative electrode 20 side (on the surface of the separator 30 on its negative electrode 20 side or on the surface of the negative electrode 20). The filler layer 32 may also be formed on both the positive electrode 10 side and the negative electrode 20 side.

Figure 10:
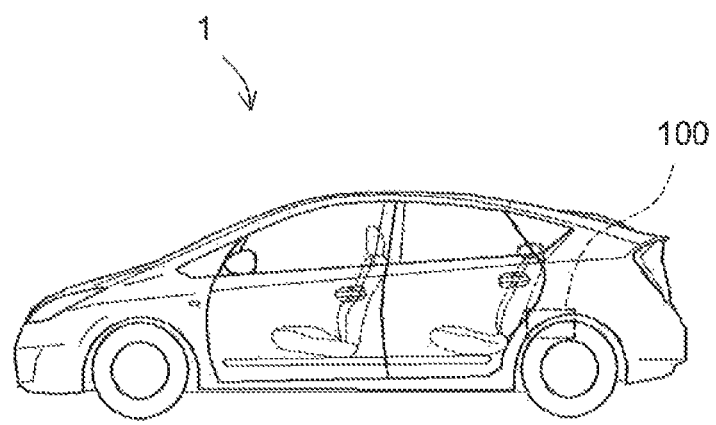
FIG. 10 is a side view that schematically shows a vehicle in which a battery according to an embodiment of the present invention is mounted.

All of the herein disclosed nonaqueous electrolyte secondary batteries 100 are provided with a performance fit for application as a vehicle-mounted battery (a nonaqueous electrolyte secondary battery for use as a vehicular drive power source). Accordingly, as shown in FIG. 10, the present invention provides a vehicle 1 that is equipped with any of the herein disclosed nonaqueous electrolyte secondary batteries 100. In particular, a vehicle 1 (for example, an automobile) is provided in which the nonaqueous electrolyte secondary battery 100 is installed as a drive power source (typically a drive power source for a hybrid vehicle or an electric vehicle).

INDUSTRIAL APPLICABILITY

The structure of the present invention can provide a nonaqueous electrolyte secondary battery that has a high durability with respect to high-rate charge/discharge and that can suppress the generation of leakage current.

The invention claimed is:

1. A nonaqueous electrolyte secondary battery, comprising
an electrode assembly having a structure in which a positive electrode and a negative electrode are stacked with a separator interposed therebetween, wherein
a thickness of the separator is from more than 20 μm to not more than 30 μm,
a porous filler layer is disposed between the positive electrode and the separator,
the filler layer contains a filler made of an inorganic material and contains a binder,
an average particle diameter of the filler is from at least 0.5 μm to not more than 2 μm,
the proportion of the filler in the filler layer as a whole is at least 90 mass %,
a porosity of the filler layer is from 50% to 60%,
an average thickness T of the filler layer is from at least 6 μm to not more than 20 μm, an average particle diameter D of a positive electrode active material present in the positive electrode facing the filler layer is at least 1 μm, and the relationship T>D holds, and
the separator is thicker than the filler layer, and the total thickness of the filler layer and the separator is from 26 μm to 40 μm, and
a pressure applied to the electrode assembly in the stacking direction is set to at least 0.1 MPa.

2. The nonaqueous electrolyte secondary battery according to claim 1, wherein the difference between the average thickness T of the filler layer and the average particle diameter D of the positive electrode active material is at least 0.5 μm.

3. The nonaqueous electrolyte secondary battery according to claim 1, wherein the average thickness T of the filler layer is at least 9 μm, and
the average particle diameter D of the positive electrode active material is not more than 8.3 μm.

4. The nonaqueous electrolyte secondary battery according to claim 1, wherein the filler incorporated in the filler layer is at least one metal compound selected from the group consisting of alumina, magnesia, zirconia, silica, boehmite, and titania.

5. The nonaqueous electrolyte secondary battery according to claim 1, wherein the shape of the positive electrode active material is spherical or oval spherical.

6. The nonaqueous electrolyte secondary battery according to claim 1, wherein the positive electrode has, as the positive electrode active material, a lithium transition metal complex oxide that contains at least one metal element selected from the group consisting of nickel, cobalt, and manganese.

7. A battery pack comprising a plurality of the nonaqueous electrolyte secondary batteries according to claim 1 connected in series, wherein each of the nonaqueous electrolyte secondary batteries is provided with the electrode assembly and a battery case that houses the electrode assembly and a nonaqueous electrolyte, and
a retaining pressure applied to a surface of the battery case is set to at least 0.1 MPa.

8. The battery pack according to claim 7, wherein the battery case is made of aluminum or an aluminum alloy.

9. The nonaqueous electrolyte secondary battery according to claim 1, wherein the filler layer further contains at least one thickener chosen from carboxymethyl cellulose and polyethylene oxide.

* * * * *